United States Patent [19]
Chun

[11] Patent Number: 5,506,628
[45] Date of Patent: Apr. 9, 1996

[54] MENU-TYPE MULTI-CHANNEL SYSTEM HAVING A PAGE UP/DOWN MODE FEATURE

[75] Inventor: Yu J. Chun, Seoul, Rep. of Korea

[73] Assignee: SamSung Electronics Co., Ltd., Kyungki-do, Rep. of Korea

[21] Appl. No.: 563

[22] Filed: Jan. 4, 1993

Related U.S. Application Data

[63] Continuation-in-part of Ser. No. 807,414, Dec. 13, 1991, which is a continuation of Ser. No. 771,807, Oct. 8, 1991, which is a continuation of Ser. No. 365,573, Jun. 14, 1989.

[30] Foreign Application Priority Data

Jun. 14, 1988 [KR] Rep. of Korea .................... 1988/7120

[51] Int. Cl.$^6$ ..................................................... H04N 5/45
[52] U.S. Cl. .......................... 348/565; 348/567; 348/588; 348/732
[58] Field of Search ................................ 358/183, 193.1, 358/191.1; 455/166; 348/565, 567, 568, 588, 732, 731; H04N 5/45

[56] References Cited

U.S. PATENT DOCUMENTS 4,914,516  4/1990  Duffield .................................. 358/183

FOREIGN PATENT DOCUMENTS

50471   3/1986  Japan ................................ H04N 5/45
277275  12/1986 Japan ................................ H04N 5/45
146671  6/1988  Japan ................................ H04N 5/45

Primary Examiner—James J. Groody
Assistant Examiner—Sherrie Hsia
Attorney, Agent, or Firm—Robert E. Bushnell

[57] ABSTRACT

A menu type multi-channel display system utilizing picture-in-picture (PIP) function and a page up/down mode. The present invention first comprises a first and second tuner to receive broadcasting signals and to output each of the broadcasting signals on a channel. The present invention further comprises a main screen selecting module to select either one of said first and second tuner or a line input signal and to output at least one main screen signal. The present invention further comprises a sub-screen selecting module to select either the first tuner, the second tuner, or a line input signal, and to then output a subscreen signal. The present invention further comprises a VCR signal processing circuit to screen-process the output signals from a reproduction output module of the main screen selecting module and to output a screen signal. The present invention further comprises a PIP processing circuit to input the screen signals from the VCR signal processing circuit and the sub-screen selecting module and to output a PIP multi-screen signal. The present invention further comprises an audio output selecting circuit to select and output phonetic signals processed from the PIP processing circuit to a main screen. The present invention further comprises a control module to control the circuits separately according to the output selection of the tuners, the VCR reproduction mode or the multi-channel page up/down signal.

24 Claims, 12 Drawing Sheets

|  | SKIP MEMORY |
|---|---|
| POSITION 1 | K |
| POSITION 2 | L |
| POSITION 3 | M |
| POSITION 4 | NON ADDED CH |
| POSITION 5 | N |
| POSITION 6 | NON ADDED CH |
| POSITION 7 | O |
| POSITION 8 | P |
| POSITION 9 | Q |
| POSITION 10 | R |
| ⋮ | ⋮ |
| POSITION 32 |  |

FIG. 7B

MENU-TYPE MULTI-CHANNEL SYSTEM HAVING A PAGE UP/DOWN MODE FEATURE

This is a Continuation in Part of application Ser. No. 07/807,414 filed on Dec. 13, 1991, which is a Continuation of the application Ser. No. 07/771,807 filed on Oct. 8 1991, which is a Continuation of the application Ser. No. 07/365,573 filed on Jun. 14, 1989.

BACKGROUND OF THE INVENTION

This invention relates to the control and display of simultaneous plural video images on standard television equipment. The invention is a menu-driven multi-channel system in which a user easily selects channels by executing page up and page down commands.

The invention utilizes the picture-in-picture (PIP) function of existing and well-known television and video cassette recorder (VCR) technology. However, current technology displays only one sub-screen video image in the corner of a main screen. This invention displays more than one sub-screen in a main screen.

SUMMARY OF THE INVENTION

An object of the invention is to display plural images on a single television screen.

Another object of the invention is to provide a convenient and easy-to-use menu system for television channel selection.

The invention provides a menu-type multi-channel video display system with page up/down mode comprising:

a skip memory, a television tuner circuit, a VCR signal processing circuit, a switching circuit, a PIP processing circuit an input selector for the main screen, an output selector for the sub-screen, a microcomputer, an on-screen display integrated circuit (OSDIC), a mixer, an audio circuit, two tuners, and a multiplexer.

Television channels are stored in the skip memory and assigned to a particular sub-screen. When the main screen is in PIP mode, and a multi-channel signal is received (from a user activating the multi-channel capability), the channels stored in skip memory are displayed in menu format, and can be selected by a novel page up/page down feature. This allows a user to easily and conveniently select the channel of his choice.

BRIEF DESCRIPTION OF DRAWINGS

FIG. 2 (A) is a multi-channel strobing time chart;

FIG. 2 (B) is a reference time variation chart;

| DRAWING REFERENCE NUMERALS | |
|---|---|
| 501 | T.V. tuner circuit |
| 502, 512 | signal processing circuit of VCR |
| 503, 513 | switch part |
| 504, 514 | PIP processing circuit |
| 510 | input selector of main screen |
| 511 | output selector of sub-screen |
| 600 | micro-computer |
| 610 | OSD IC (On Screen Display Integrated Circuit) |
| 620 | mixer |
| 630 | audio circuit |
| 640 | multiplexer |
| 650 | tuner 1 |
| 660 | tuner 2 |

DETAILED DESCRIPTION OF THE PREFERRED EMBODIMENT

Multi-channel mode is defined as n PIP sub-screens within a main screen, where each screen data of said PIP sub-screens is fetched from skip memory and displayed on the n PIP sub-screens at the same time.

Multi-channel mode can work on the PIP system with either tuner 1 or tuner 2. In multi-channel mode, the procedure of PIP control is as follows: when a multi-channel signal is received (as when a multi-channel key is actuated by a user), the multi-channel mode activates, and the skip memory is scanned. FIG. 4B describes the TV screen on which the main screen is a blue screen not receiving a broadcasting signal and the subscreens are multi-channel screens when the TV is turned on but is not in playback mode.

If there is a synchronized signal on a channel during the multi-channel mode, the channel becomes an effective channel as shown in timing diagram FIG. 1 (A):

In FIG. 1 (A), a multi-channel signal is received from a user. Following this signal, the user initiates a command to rotate the subscreen images (shown as $\pi$). (1) is the current output of the PIP which corresponds to the current video sub-screen image. (2) is the requested data output or sub-screen image. (3) is an output signal activated when the tuner selects a channel. (4) represents an auto fine tuning (AFT) function completed after the channel is initially tuned. (5) represents the output of new data from the PIP replacing the prior image. It is assumed that the channels K to N are stored in the skip memory.

If no synchronized signal is found in the multi-channel mode, the channel becomes an ineffective channel as shown in FIG. 1 (B):

In FIG. 1-(B), 1' to 3' execute the same function as 1 to 3 of FIG. 1 (A). 4' is an output signal transmitted when no synchronized signal is found for the channel. 5' is an output signal jumping to a corresponding channel. 6' is an output signal for repeating the processes of 1' to 5' until the channel position having a synchronized signal is found, and 7' executes the process of FIG. 1-(A) when a synchronized signal is found.

Thus, the channels stored in the skip-memory become active as shown in FIG. 1 (C), where it is assumed that a NON-ADDED channel exists in position 3 and an ineffective channel is in position 4.

The NON-ADDED channel for a particular position, as shown, is defined as a channel not stored in the skip memory position.

The screen displayed by the operation of FIG. 1 (B) represents the display of channels K, L, N and O, as shown in FIG. 1-(D), where channel M, which does not have a synchronization signal of FIGS. 1-(A), is skipped. If a specific channel, for example channel N is selected from the displayed channels K, L, N, and O, by a user as shown in FIG. 1 (E), the selected channel N will then be displayed on the main screen.

Figure 1A:
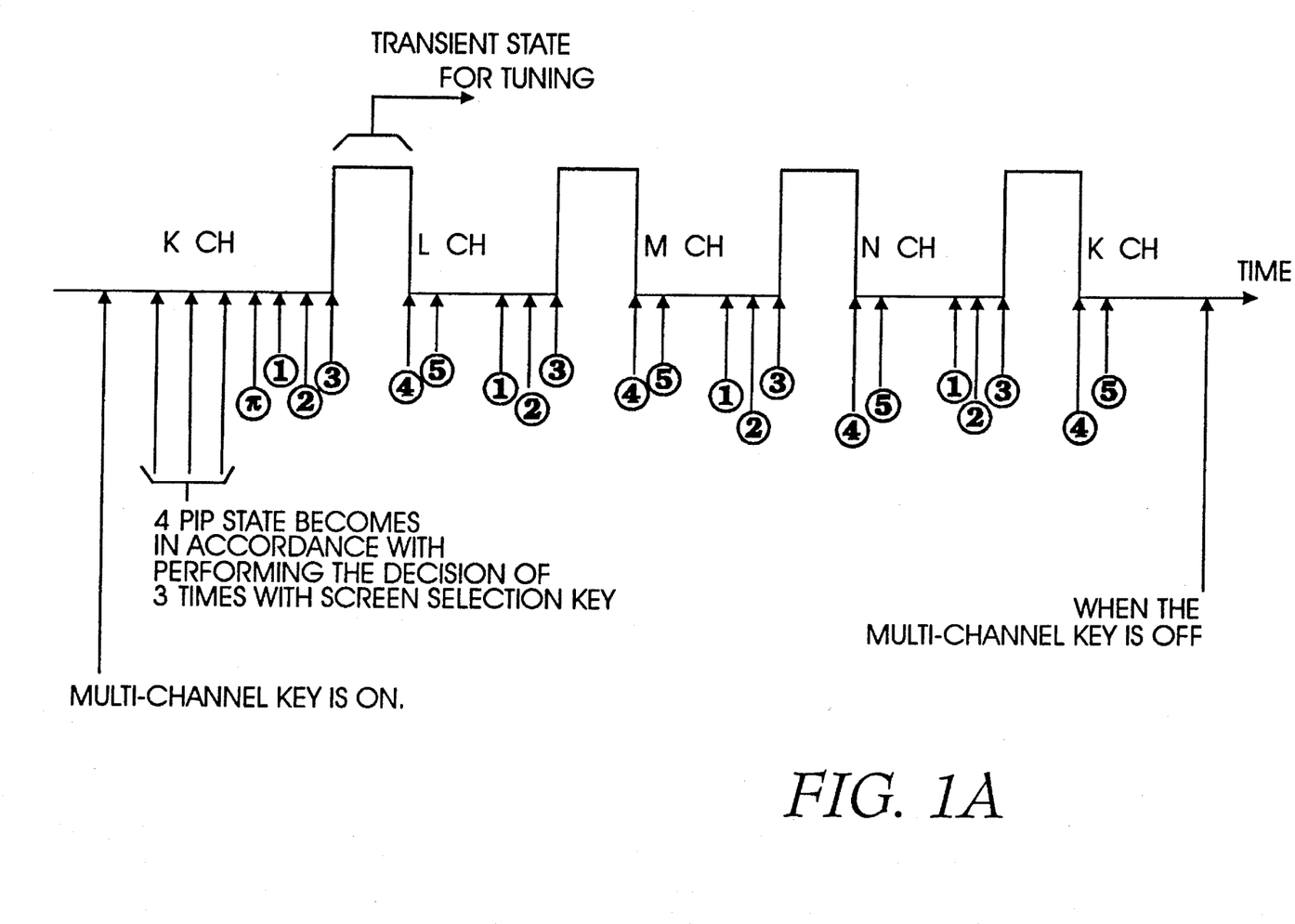
FIGS. 1(A) and 1B are the waveforms for PIP and tuning for the exemplary embodiment of the present invention.
Figure 1B:
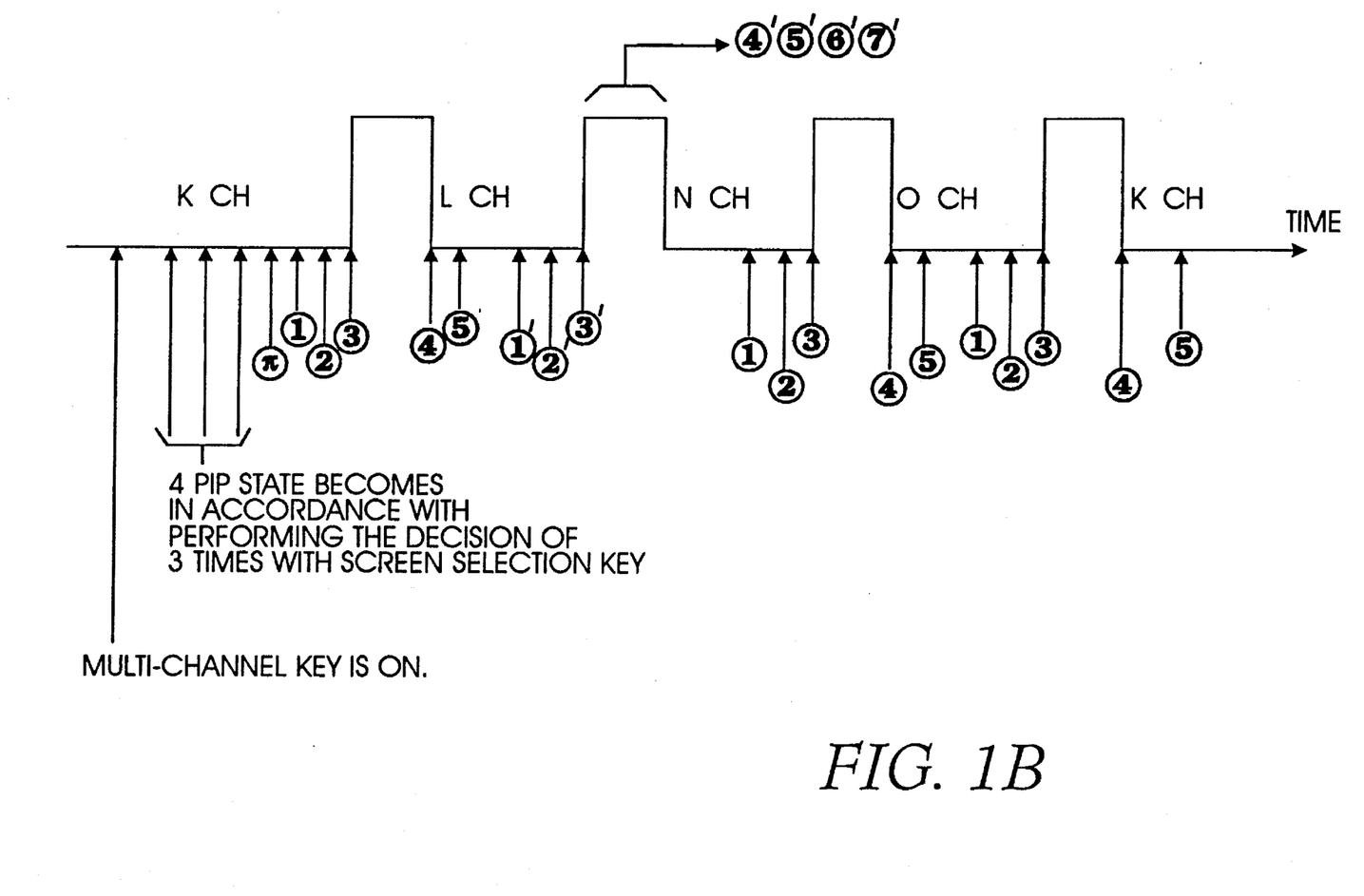
Figure 1C:
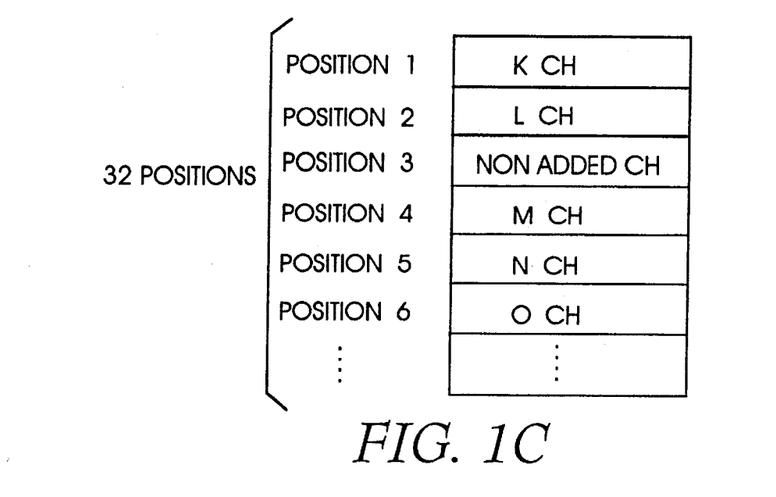
FIG. 1(C) is a representation of skip memory showing the position in the memory of various television channels.
Figure 1D:
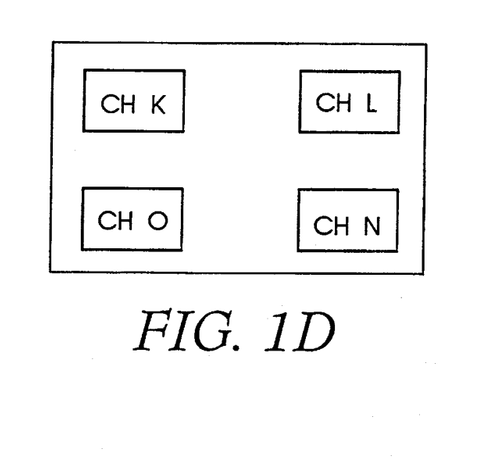
FIG. 1(D) and 1E are status diagrams of multi-channel displays which are displayed in a main screen.
Figure 1E:
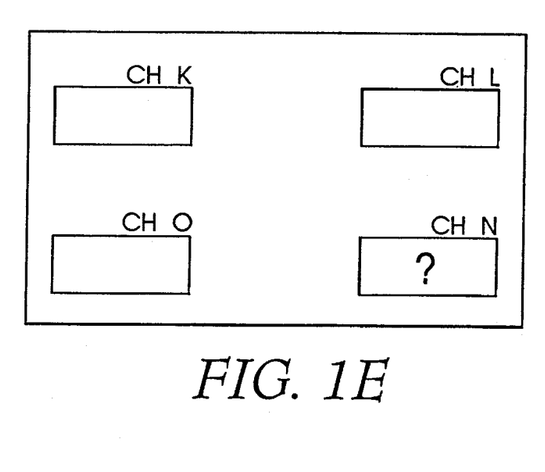
Figure 2A:
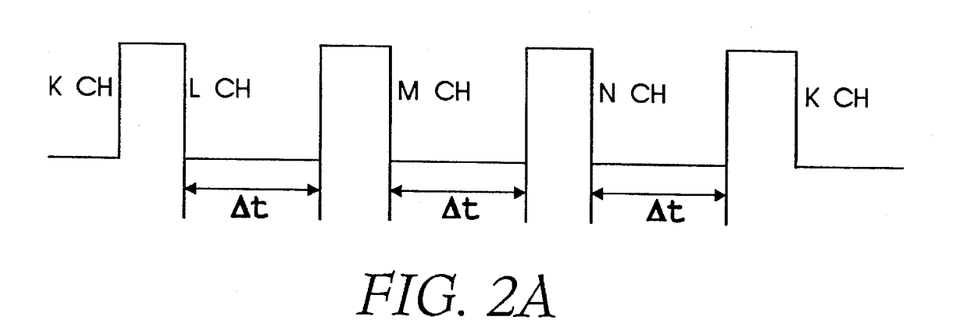
Figure 2B:
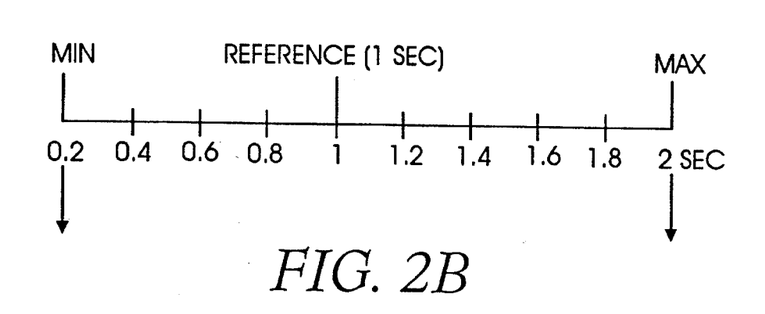

FIGS. 2A and 2B show the waveform strobing time of multi-channel page up/page down operation. FIG. 2-(A) indicates the time (t) between successive channel selections.

FIG. 2-(B) shows the process of making the strobing time 0.2 second per step when the reference time of the changed time (At) is 1 second.

FIG. 3-(A) shows a skip memory consisting of 32 positions. FIG. 3-(B) shows one page of a TV screen on which four channels corresponding to four positions of the skip memory are displayed when the multi-channel feature is on.

Figure 3A:
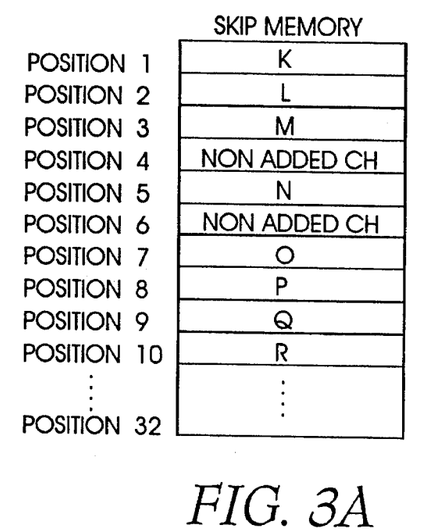
FIGS. 3(A), 3B, 3C and 3D are strobing charts of screens depicting the relationship of channel memory location to sub-screen location.
Figure 3B:
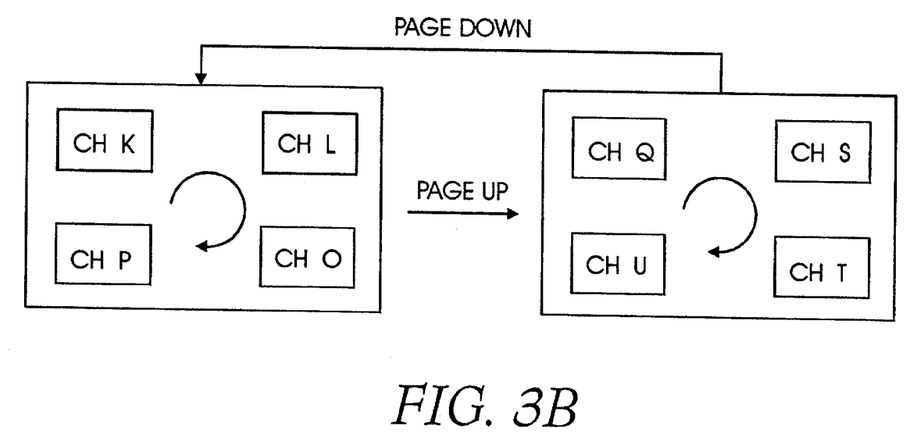
Figure 3C:
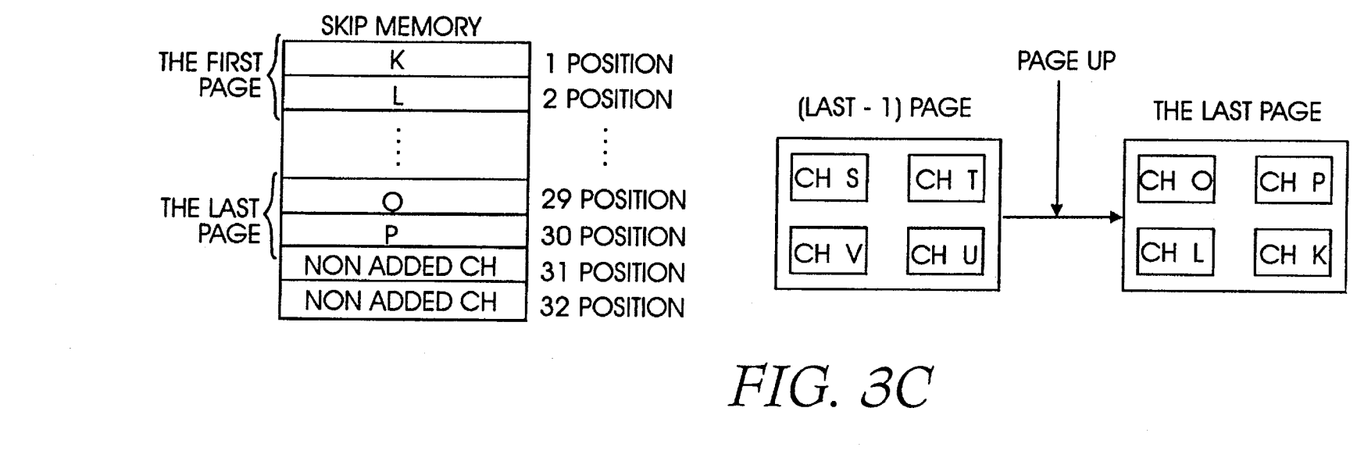

It is possible to have P pages in the skip memory. If each page is defined to display 4 positions then 4P channel positions are available overall.

It was assumed in FIG. 3-(A) that position 4 and position 6 are non-added channels, and position 3 and position 10 are ineffective channels (having no synchronized signal). In the case of FIG. 3(B), each of four channels corresponding to four positions of the skip memory is displayed on one page of one TV screen, and it is possible to change the display by use of a page up or page down command.

The arrow of FIG. 3-(B) indicates the direction of the progress of strobing according to each channel.

FIG. 3-(C) shows the progress of the page up/down display. FIG. 3(D) indicates channels added to the skip memory.

Figure 3D:
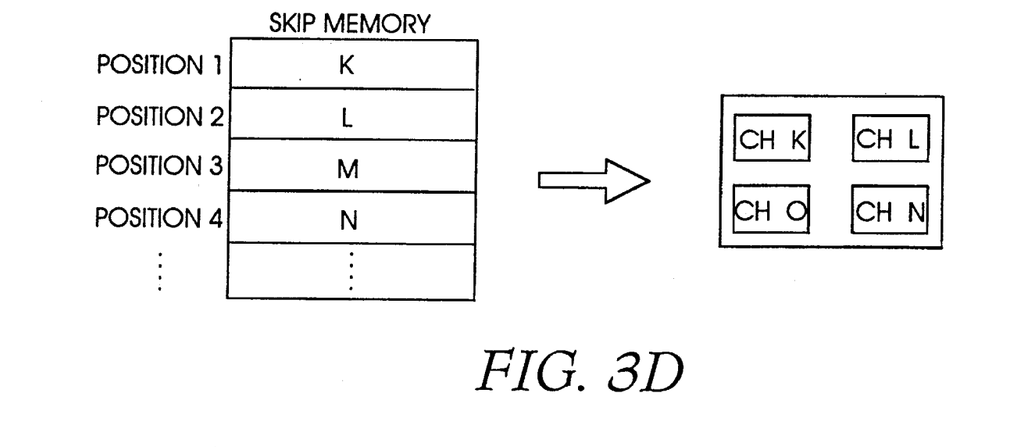

If there are channels which do not have synchronous signals, the channel selector skips the channels. Thus, multi-channel mode is realized through the selection of positions having synchronous signals. As an example, if position 3 is an ineffective channel not having a synchronous signal, the channel is skipped over and an effective channel becomes active.

FIGS. 4A–4E show that multiple channels are displayed on a single screen.

Figure 4A:
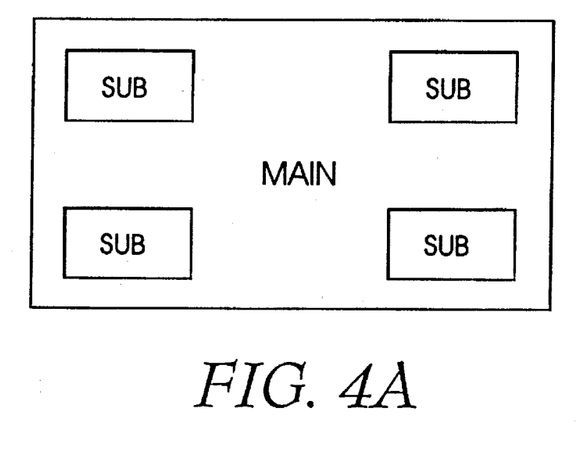
FIGS. 4A, 4B, 4C, 4D and 4E are the display charts of the main screen and sub-screen of tuner 1 and tuner 2.
Figure 4B:
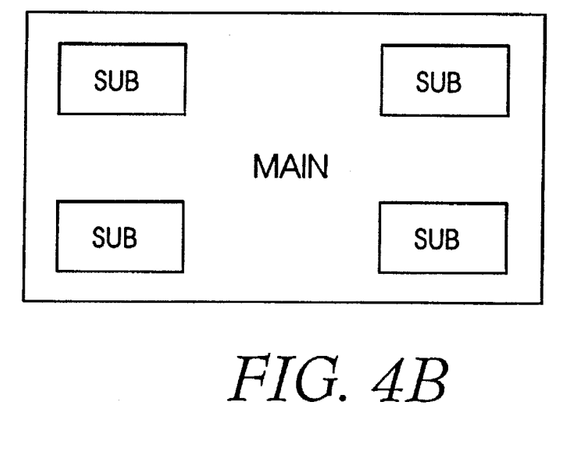

FIG. 4A shows that a main screen is a playback screen (PB screen) and the sub-screens are multi-channel screens when tuner I is in play back mode.

Figure 4C:
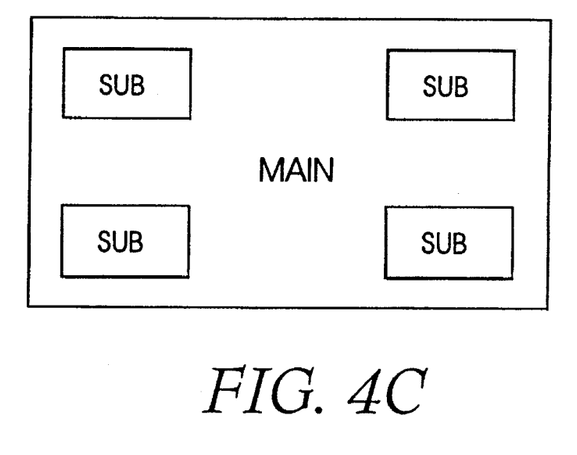

FIG. 4C shows that the main screen is a playback (PB) screen and the sub-screens are multi-channel screens when tuner 2 is in a playback mode.

Figure 4D:
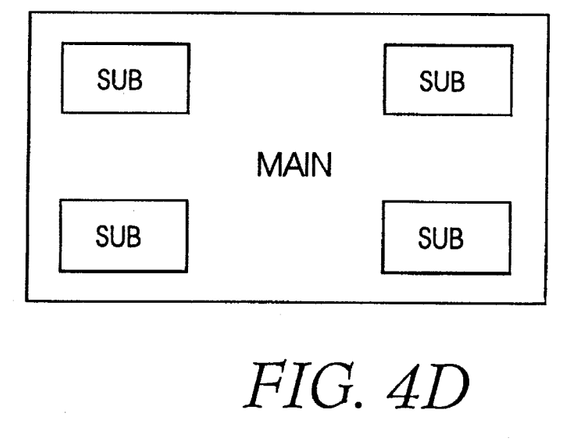

FIG. 4D shows that, when there is a synchronizing signal in a main screen but the screen is not in the playback mode, the main screen displays tuner 1 or a single line and the sub-screen displays tuner 2.

Figure 4E:
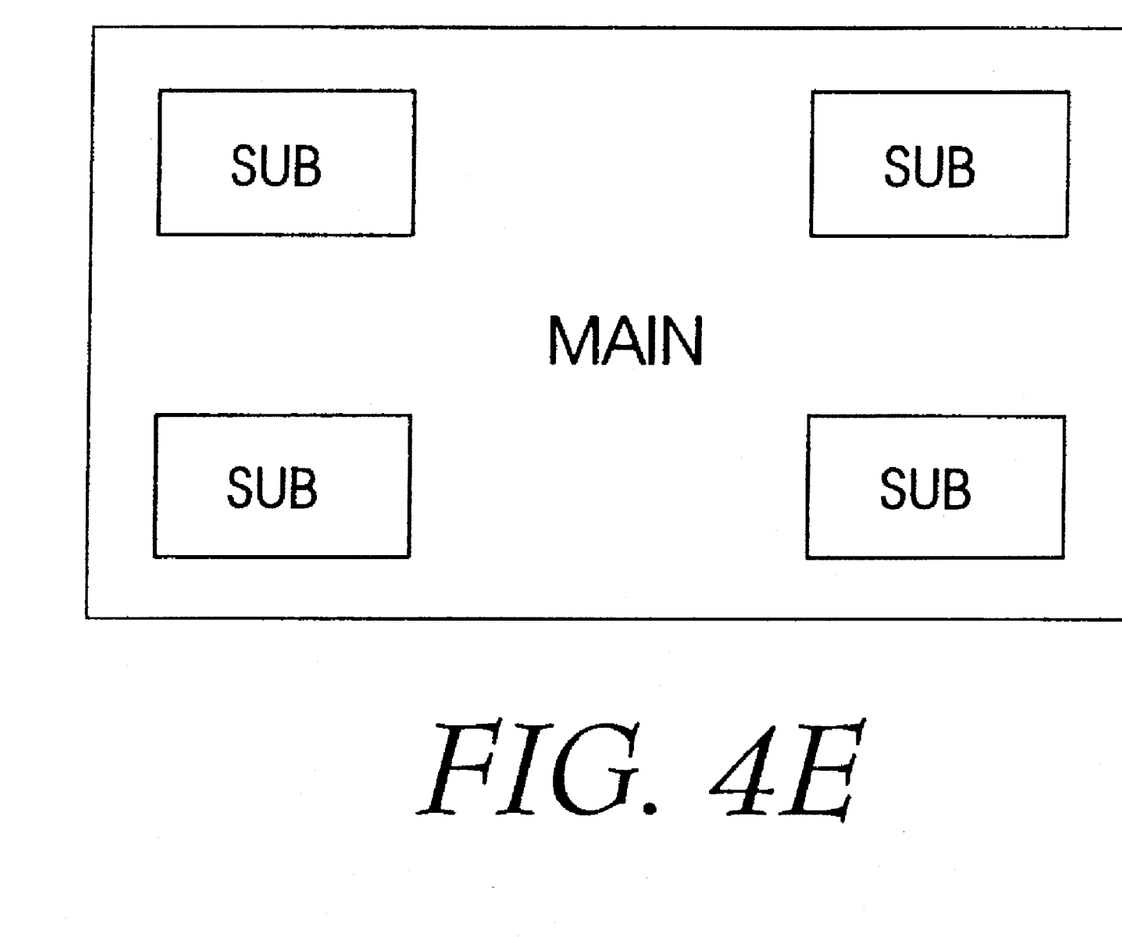

FIG. 4E shows that, when there is a synchronizing signal in a main screen but the screen is not in the playback mode, the main screen displays tuner 2 or a line screen and the sub-screen displays tuner 1 or tuner 2.

FIG. 5 (A) is the tuner I system and FIG. 5-(B) is the tuner 2 system.

Figure 5A:
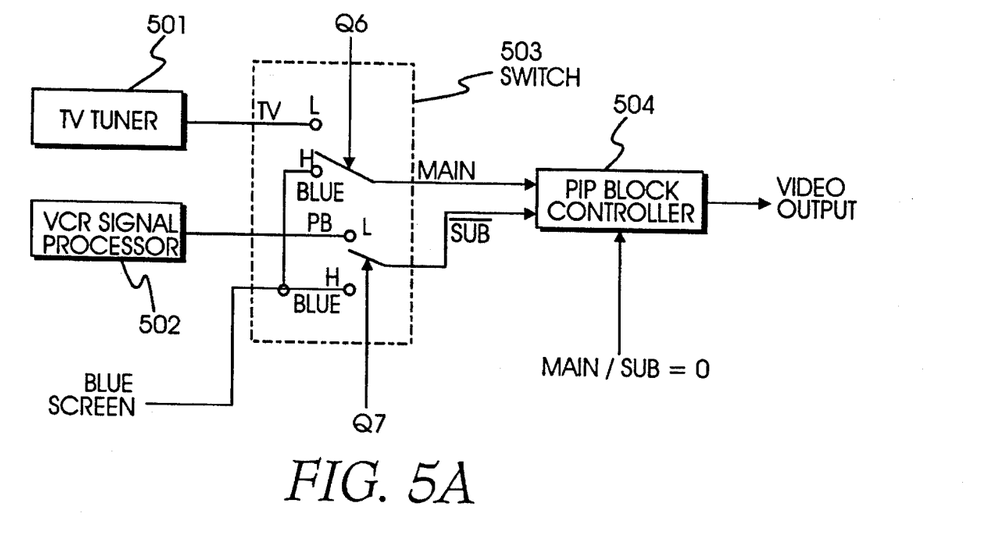
FIGS. 5(A), 5C, 5B and 5D are hardware block diagrams of tuner 1 and tuner 2, respectively.

The tuner I system comprises a TV tuner circuit (501), a VCR signal processing circuit (502), a switching circuit (503) which selects blue-screen signal whose channel does not receive any broadcasting signal and is controlled by control signals for the main screen (Q7) and the sub-screen (Q6), and PIP block (504) for controlling the PIP.

Figure 5B:
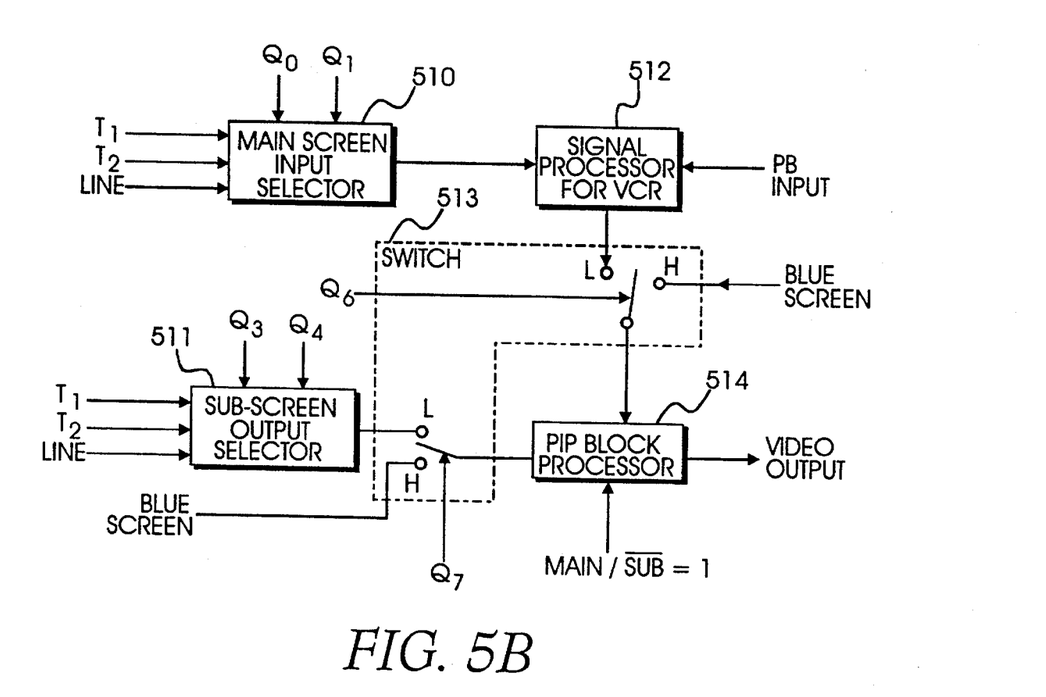

The tuner 2 system comprises a main screen input selector (510), sub-screen output selector (511), signal processing block (512) for the VCR, switching circuit (513) which selects blue screen and is controlled by control signals for the main screen (Q7) and the subscreen (Q6), and PIP block (514) for processing them in PIP mode.

Figure 5C:
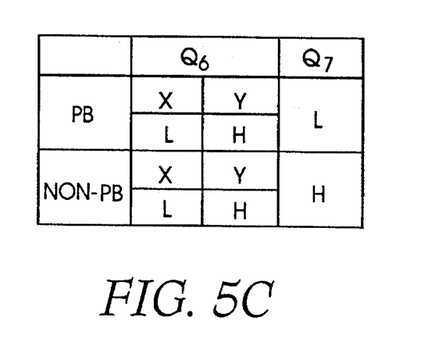
Figure 5D:
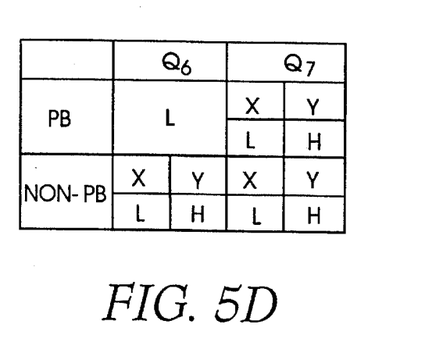

FIGS. 5C and 5D describe the operation of the tuner 1 and tuner 2 systems. "X" denotes a NORMAL state which has a synchronous signal and "Y" indicates an ineffective channel (having no synchronous signal).

In the example of FIG. 5D, Q6 becomes L (low) and selects the playback (PB) screen as the main screen (during playback mode).

Q7 sets "X" to L if a synchronous signal is detected and selects the received channel as a sub-screen. If no synchronous signal is detected, then Q7 sets "Y" to (high) and selects blue-screen as a sub-screen.

Next, in the non-playback mode, Q6 and Q7 select either the received channel or blue screen as main screen or sub-screen according to whether a synchronous signal is found for the channel.

Figure 6:
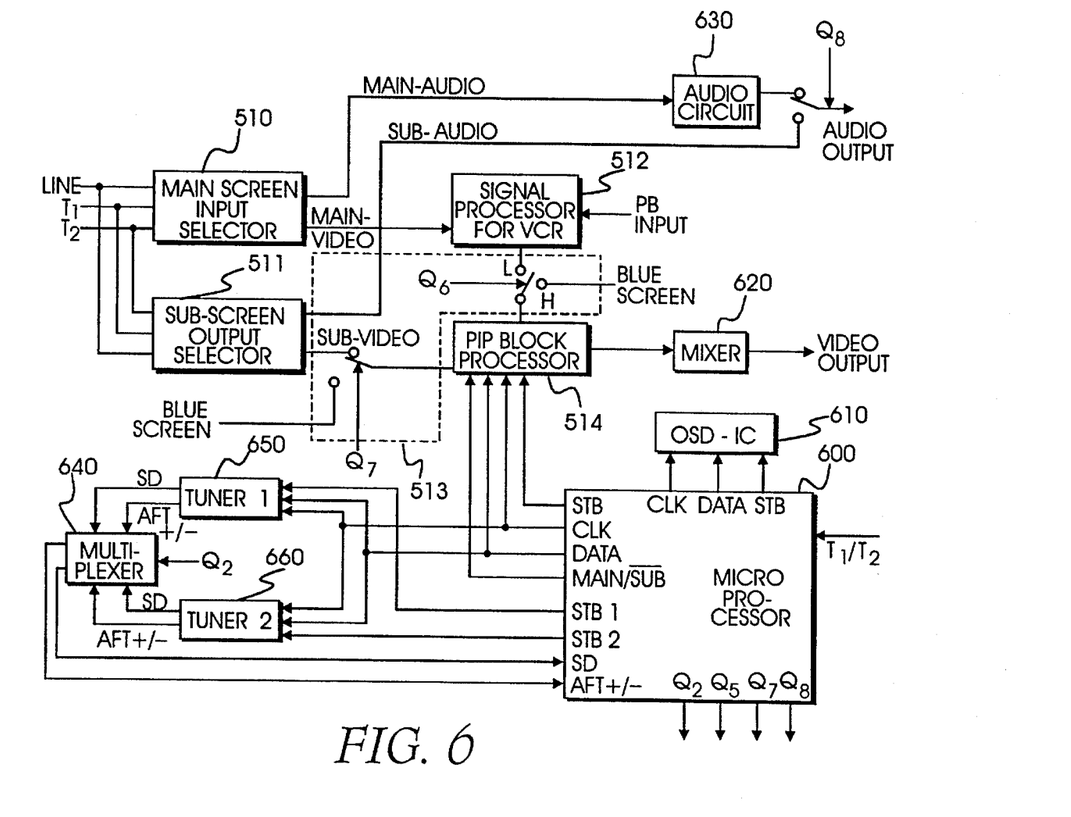
FIG. 6 is the total hardware block diagram for the multi-channel operation of this invention.

FIG. 6 shows a complete system composed of tuners 1 and 2 of FIGS. 5A–5D, and a microcomputer as a controller.

Figure 7A:
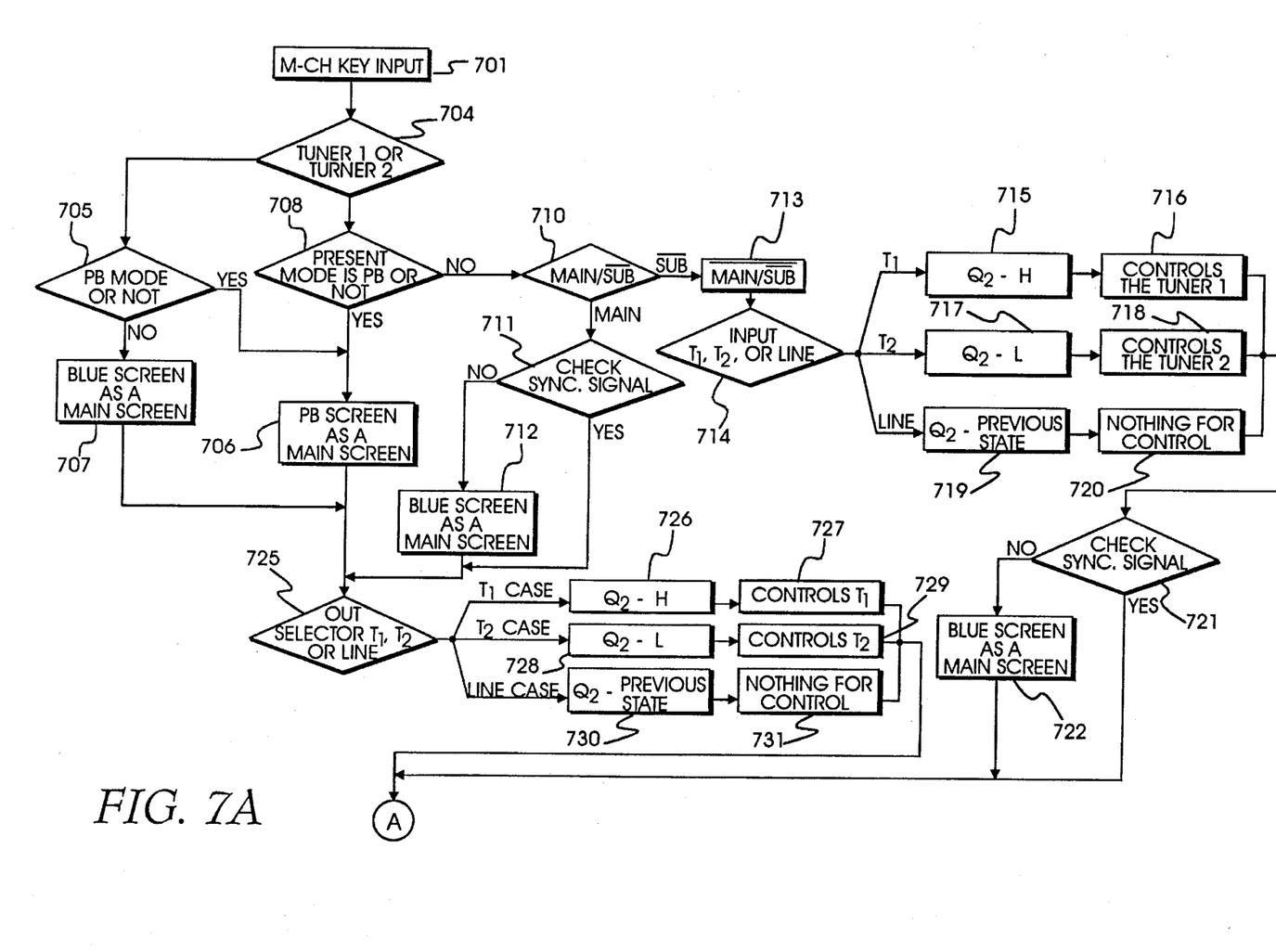
FIGS. 7A and 7B are flow chart for the multi-channel operation of this invention.
Figure 7B:
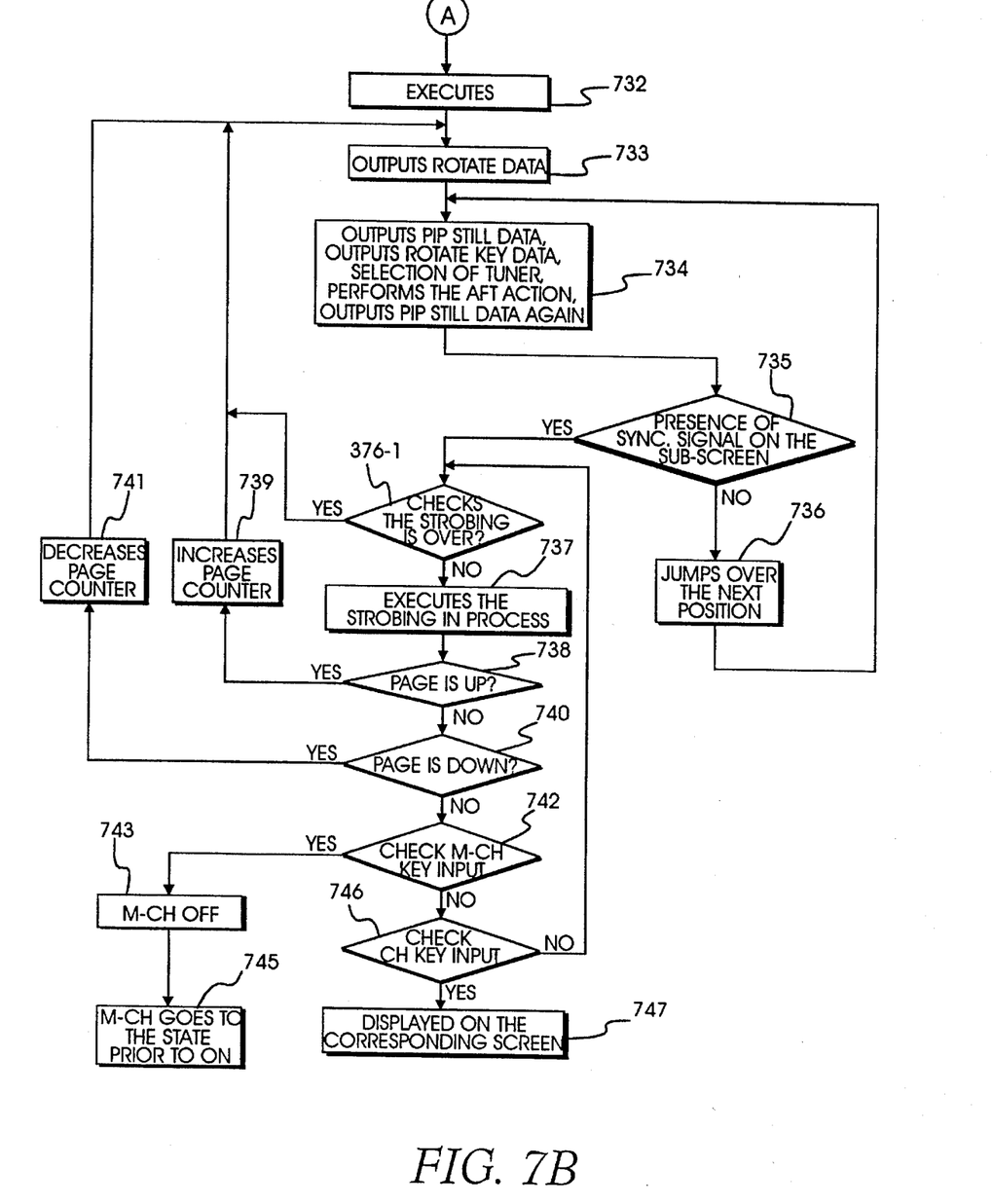

FIGS. 7A and 7B are flow charts for the system of FIG. 6.

If microcomputer (600) receives a channel input (step 701), it makes a decision whether the channel is the tuner 1 system or tuner 2 system (step 704). If the channel is tuner 1, it will determine whether the channel is in playback mode or not (step 705).

If it is not in playback mode, it selects the blue screen as a main screen (707). If the tuner system is tuner 2, it will determine whether the present mode is playback mode or not (step 708). If it is in playback mode, it selects the playback screen as the main screen (step 706). If it is not in playback mode, it will determine whether it is a main screen or a sub-screen (step 710).

If it is a main screen, it will check the existence of a synchronous signal (step 711). If no synchronous signal is detected, it selects the blue screen as the main screen (step 712). If the signal is a sub-screen (step 710), it reverses the mode of main/sub again (step 713) and selects a main screen according to the kind of input: tuner 1, tuner 2 or LINE (step 714).

If the input is tuner 1, the controller sets Q2 to H (step 715) and controls the tuner 1 (step 716).

If the input is tuner 2, the controller sets Q2 to low (step 717) and controls tuner 2 (step 718).

If the input is LINE, the controller keeps the previous state of Q2 (step 719) and does nothing for control (step 720).

When a main screen is selected according to the above process, the controller selects the blue screen as a main screen (step 722) according to the existence of a synchronous signal (step 721).

In contrast, the selection of a sub-screen is determined according to whether the output selector is tuner 1, tuner 2 or LINE (step 725).

If the output selector is tuner 1, the controller sets the signal Q2 to high (step 726), and controls tuner 1 (step 727). If it is tuner 2, the controller sets the signal Q2 low (step 728), and controls tuner 2 (step 729).

If it is LINE, the controller keeps the previous state of Q2 (step 730) and does nothing for control (step 731).

Selection of the sub-screen is completed according to the above process. The microcomputer executes the multi-channel screen according to screen 1, 2 or n (step 732), outputs both the current PIP data and the ROTATE key data (step 733), begins the selection of a tuner, performs the AFT action, and then outputs the PIP data again (step 734).

The microcomputer makes a decision based on the presence of a synchronous signal for the sub-screen (step 735).

If there is no synchronous signal, the controller jumps over to the next position (step 736). If there is a synchronous signal, the strobing is completed (step 736-1). The controller executes the strobing in progress (step 737), increases the content of the page counter (step 739) when the page up command is issued (step 738), decreases the content of the page counter (step 741) when the page down command is issued (step 740), and makes a decision as to the existence of multi-channel key input (step 742) inputted again. If there is input, the multi-channel function ceases (step 743), and the multi-channel function reverts to the state it was in prior to activation (step 745).

If there is no multi-channel key input (step 746), a corresponding channel is displayed on the corresponding screen (step 747).

Thus, according to this invention, a television screen is converted to a multi-channel display by using an existing PIP or multiscreen function, with the effect of improving the convenience and reliability of channel selection so that a user may easily select channels through a menu-based selection.

What is claimed is:

1. In a multi-channel picture-in-picture television display system, a method for controlling a selection of television channels for display, comprising the steps of:

scanning a skip memory having a plurality of positions storing video information in correspondence with a plurality of television channels to be displayed on a display screen, for television channel allocations by detecting television channels with synchronization signals to be displayed on corresponding sub-screens of said display screen, and displaying the detected television channels on said sub-screens of said display screen;

receiving a page up/down command representative of one of a page-up command and a page-down command; and sequentially scanning said skip memory for detecting a next sequence of television channels with synchronization signals to be displayed on said corresponding sub-screens of said display screen and displaying the detected next sequence of television channels on said corresponding sub-screens of said display screen in accordance with said page up/down command.

2. The method as claimed in claim 1, further comprising the steps of:

skipping positions in said skip memory that do not have a corresponding television channel allocation; and skipping positions in said skip memory that do not have a corresponding synchronization signal.

3. Menu type multi-channel display system utilizing picture-in-picture functions and a page up/down mode, comprising:

first and second tuner means for receiving a plurality of broadcasting signals to provide each of said plurality of broadcasting signals on different respective channels;

main screen selector means for selecting a first one of said broadcast signals from a first one of said first and second tuner means and a line input terminal to provide a selected main screen signal for a main screen of a display screen;

sub-screen selector means for selecting a second one of said broadcast signals from a second one of said first and second tuner means and said line input terminal to provide a selected sub-screen signal for a sub-screen of said display screen;

signal processor means for screen-processing said selected main screen signal and a mode signal representative of one of a playback mode and a non-playback mode to provide a processed screen signal;

switch means for enabling transmission of one of said processed screen signal and a selected color-screen signal in response to a first control signal to provide a first intermediate screen signal, and for enabling transmission of one of said selected sub-screen signal and said selected color-screen signal in response to a second control signal to provide a second intermediate screen signal; and picture-in-picture processor means for converting said first and second intermediate screen signals into picture-in-picture multi-screen signals.

4. The system as claimed in claim 3, wherein said picture-in-picture processor means reverses said main screen and said sub-screen of said display screen in accordance with a main/sub signal input from a controller.

5. A method of performing a page up/down mode in a menu-type-multi-channel display system utilizing a picture-in-picture display, comprising the steps of:

sequentially scanning a present set of channel data stored in a skip memory having a plurality of positions, each position storing a corresponding one of a plurality of television channels to be displayed on a main screen for identifying television channels among said plurality of television channels having synchronizing signals;

selecting a number of television channels from among the identified television channels capable of being displayed on a corresponding plurality of sub-screens of said main screen, and displaying the selected television channels on said plurality of sub-screens;

determining whether a page up/down command is input by a viewer;

and sequentially scanning for one of a next set of television channels and a previous set of television channels having synchronizing signals corresponding to a number of television channels of said plurality of sub-screens, and displaying the corresponding television channels on said plurality of sub-screens in dependence upon said page up/down command, whereby on said plurality of sub-screens, the television channels corresponding to the number of the subscreens are simultaneously displayed in dependence upon said page up/down command.

6. A menu-type multi-channel system, comprising:

means for receiving a command signal;

skip memory means having a plurality of channel positions corresponding to a plurality of television channels, for providing selected television channels to be displayed on a plurality of sub-screens of a main screen in dependence upon reception of said command signal, each television channel of said selected television channels having a corresponding synchronization signal;

display means for displaying said selected television channels on said plurality of subscreens of said main screen; and means for rotating the displayed selected television channels on said plurality of sub-screens of said main screen by scanning through said plurality of channel positions of said skip memory means.

7. A menu-type multi-channel system as claimed in claim 6, further comprising:

means for providing a selected television channel having a corresponding synchronization signal to be displayed on said main screen;

means for determining whether said selected television channel to be displayed on said main screen is in a television mode; and means for displaying said selected television channel having said corresponding synchronization signal on said main screen.

8. A menu-type multi-channel system, comprising:

means for receiving a command signal representative of one of a multi-screen signal and a page up/down signal from one of a keypad and a remote controller;

skip memory means having a plurality of channel positions corresponding to a plurality of television channels, for providing a predetermined number of television channels on a corresponding number of sub-screens of a main screen of a display screen in dependence upon reception of said command signal representative of said multi-screen signal, each television channel of said predetermined number of television channels having a corresponding synchronization signal, said skip memory means providing said predetermined number of television channels on said corresponding number of sub-screens by scanning through each channel position of said predetermined number of channel positions for detecting whether a synchronization signal exists for each scanned channel position; and display means for displaying said predetermined number of television channels on said corresponding number of sub-screens of said main screen of said display screen.

9. A menu-type multi-channel system as claimed in claim 8, wherein said predetermined number of television channels on said corresponding number of subscreens and said main screen constitute a page, and said skip memory means skips channel positions having no existing synchronization signals.

10. A menu-type multi-channel system as claimed in claim 9, wherein said predetermined number of television channels on said corresponding number of subscreens of said main screen rotate forward and backward in dependence upon reception of said command signal representative of said page up/down signal.

11. A menu-type multi-channel system as claimed in claim 8, wherein said number of sub-screens on said main screen is four and constitutes a page, and said plurality of channel positions of said skip memory means is thirty-two.

12. A menu-type multi-channel system as claimed in claim 10, further comprising:

means for providing a selected television channel to be displayed on said main screen in dependence upon reception of a main screen signal;

means for determining whether said selected television channel to be displayed on said main screen is in a television mode; and means for displaying one of said selected television channel and a subscreen of selected color-on said main screen in dependence upon whether said selected television channel having said] a corresponding synchronization signal.

13. An improved method of operation for a picture-in-picture (PIP) video display system capable of displaying a selected number of P channel representations from a plurality of N channel representations of television channels broadcasted in a predetermined mode of operation, wherein N is greater than P, and N and P are integers, the improved method comprising the steps of:

(a) displaying a first set of said P channel representations of the television channels broadcasted on a screen in response to a first control signal for setting said predetermined mode of operation; and (b) when a second control signal different from said first control signal is input to said video display system, displaying a second set of said P channel representations of the television channels broadcasted on said screen; wherein at least one of said P channel representations in said first set and said second set of said P channel representations displayed on said screen is to be selected for sole visual display on said screen by a user during said steps (a) and (b).

14. An improved method of operation for a picture-in-picture (PIP) video display system capable of displaying a plurality of P channel representations from a plurality of N channel representations of television channels broadcasted and stored in corresponding memory locations within said picture-in-picture video display system in a predetermined mode of operation, wherein N is greater than P, and N and P are integers, the improved method comprising the steps of:

(a) retrieving a first plurality of said P channel representations of the television channels for a visual display on a screen in response to a first control signal for setting said predetermined mode of operation; and (b) when a second control signal different from said first control signal is input to said video display system, retrieving a second plurality of said P channel representations for a visual display on said screen.

15. An improved method of operation for a picture-in-picture (PIP) video display system capable of displaying a plurality of P channel representations from N stored channel representations of television channels broadcasted on a screen in a predetermined mode of operation, wherein each of said N channel representations is stored in a corresponding memory location of a video display system memory, wherein N is greater than P and wherein N and P are integers, the improved method comprising the steps of:

retrieving a first plurality of said P channel representations from said N channel representations stored in said video display system memory in response to a first control signal for setting said predetermined mode of operation;

updating said screen of said picture-in-picture video display system to display said first plurality of said P channel representations retrieved from said N channel representations;

when a second control signal different from said first control signal is input to said video display system, retrieving a second plurality of said P channel representations from said N channel representations stored in said video display system memory; and (d) updating said screen of said picture-in-picture video display system to display said second plurality of said P channel representations retrieved from said N channel representations.

16. In a multi-channel menu-type picture-in-picture television display system comprising a skip memory having a plurality of channel positions storing television channel data to be displayed on sub-screens of a main screen, a method for paging available television channels for a display on the sub-screens while maintain a visual display of a current television channel on the main screen, comprising the steps of:

sequentially scanning available television channel data stored in said skip memory to detect television channel data with synchronization signals and select a first sequence of television channels to be displayed on sub-screens of a main screen, and displaying the selected television channels on said sub-screens;

receiving a command signal representative of a page-up command and a page-down command from a user;

sequentially scanning the next television channel data stored in said skip memory to detect television channel data with synchronization signals and select a second sequence of television channels to be displayed on said sub-screens of said main screen, and simultaneously displaying the selected television channels on said sub-screens, when said command signal is representative of said page-up command; and sequentially scanning the previous television channel data stored in said skip memory to detect television channel data with synchronization signals and select a third sequence of television channels to be displayed on said sub-screens of said main screen, and simultaneously displaying the selected television channels on said sub-screens, when said command signal is representative of said page-down command.

17. The method for paging television channels as claimed in claim 16, wherein said skip memory comprises thirty two channel positions for storing television channel data to be displayed on said sub-screens, and the number of said sub-screens of said main screen is four.

18. An improved method of operation for a picture-in-picture video display system capable of displaying a plurality of P channel representations from N channel representations on a plurality of sub-screens of a main screen, said N channel representations being stored in corresponding channel positions of a skip memory, the improved method comprising the steps of:

retrieving a first plurality of said P channel representations from said N channel representations stored in said skip memory in response to a first control signal in a picture-in-picture mode of operation to be displayed on said plurality of sub-screens of said main screen; and retrieving a second plurality of said P channel representations from said N channel representations stored in said skip memory in response to a second control signal different from said first control signal to be displayed on said plurality of sub-screens of said main screen 19. The improved method of operation for a picture-in-picture video display system as claimed in claim 18, further comprised of N being thirty-two and P being four, and said skip memory comprising thirty-two channel positions for storing thirty two corresponding channel representations.

20. The display system of claim 3, further comprising:

a skip memory having a plurality of channel positions storing television channel data to be displayed on sub-screens of a main screen; and controller means for paging available television channels for a display on the sub-screens while maintaining a visual display of a current television channel on the main screen, by:

sequentially scanning available television channel data stored in said skip memory to detect television channel data with synchronization signals and select a first sequence of television channels to be displayed on sub-screens of a main screen, and displaying the selected television channels on said sub-screens:

receiving a command signal representative of a page-up command and a page-down command from a user;

sequentially scanning the next television channel data stored in said skip memory to detect television channel data with synchronization signals and select a second sequence of television channels to be displayed on said sub-screens of said main screen, and simultaneously displaying the selected television channels on said sub-screens, when said command signal is representative of said page-up command; and sequentially scanning the previous television channel data stored in said skip memory to detect television channel data with synchronization signals and select a third sequence of television channels to be displayed on said sub-screens of said main screen, and simultaneously displaying the selected television channels on said sub-screens, when said command signal is representative of said page-down command.

21. A menu-type multi-channel picture-in-picture television system having a main screen and a plurality of sub-screens within said main screen, said system comprising:

first and second tuners for respectively selecting desired television channels to be displayed on said main screen and said plurality of sub-screens;

main screen selector means responsive to said first and second tuners, for generating main video signals representing a first television channel to be displayed on said main screen when said first television channel contains a corresponding synchronization signal;

means for alternately enabling visual display of a blank screen as said main screen when said first television channel does not contain corresponding synchronization signal;

sub-screen selector means responsive to said first and second tuners, for generating subscreen video signals representing second plural television channels to be displayed on said respective sub-screens within said main screen when said second plural television channels contain respective corresponding synchronization signals;

processor means for processing said main video signals and said sub-screen video signals to provide visual display of one of said blank screen and said first television channel with said corresponding synchronization signal on said main screen and provide visual display of successive second plural television channels with said corresponding synchronization signals on said respective sub-screens within said main screen, said processor means further controlling rotation of the displayed successive second plural television channels on said respective subscreens within said main screen in response to a channel up/down command.

22. A menu-type multi-channel picture-in-picture television system as claimed in claim 21, further comprising:

a skip memory having a plurality of channel positions storing respective television channels to be displayed on corresponding sub-screens within said main screen; and said processor means, responsive to said channel up/down command, searching for television channels stored in said skip memory with respective synchronization signals and enabling said sub-screen selector means to generate said sub-screen video signals representing a next set of successive television channels with said respective synchronization signals to be displayed on said corresponding sub-screens.

23. A menu-type multi-channel picture-in-picture television system as claimed in claim 22, wherein said processor means rotates the displayed successive second plural television channels on said respective sub-screens within said main screen by successively scanning through said plurality of channel positions of said skip memory.

24. A menu-type multi-channel picture-in-picture television display method for controlling selection of television channels stored in a skip memory for a visual display on a plurality of sub-screens and a display screen, comprising the steps of:

selecting a mode of multi-channel operation to display a first set of television channels from said skip memory on the corresponding sub-screens;

selecting still screens and moving screens of the sub-screens and the display screen; and updating said skip memory to define a next set of television channels to be displayed on the corresponding sub-screens; and displaying said next set of television channels on the corresponding sub-screens.

\* \* \* \* \*